E. C. WALTERS & P. G. MASON.
CAMERA.
APPLICATION FILED FEB. 4, 1913.

1,088,492.

Patented Feb. 24, 1914.

Witnesses:
Dudley Browne
Wm. Zeaman

Inventors
E. C. Walters
AND P. G. Mason
per Jno Laurie Attorney.

UNITED STATES PATENT OFFICE.

EDWIN CECIL WALTERS AND PERCY GEORGE MASON, OF LONDON, ENGLAND, ASSIGNORS TO NEWMAN AND GUARDIA LIMITED, OF LONDON, ENGLAND.

CAMERA.

1,088,492. Specification of Letters Patent. Patented Feb. 24, 1914.

Application filed February 4, 1913. Serial No. 746,236.

*To all whom it may concern:*

Be it known that we, EDWIN CECIL WALTERS and PERCY GEORGE MASON, subjects of the King of Great Britain, residing at London, England, have invented certain new and useful Improvements in Cameras, of which the following is a specification.

This invention relates to portable cameras which are required to fold into a small space such as pocket cameras.

One object of this invention is to provide a camera which is rigid when expanded and when folded takes up very little space.

A further object is to provide such a camera with a lens casing at the front which is capable of rising in two directions, that is to say to give what is commonly known as a double rise. By this is meant that the lens is movable in a plane parallel to the vertical sides of the plate, both when the camera is arranged to give a broad picture and a narrow picture.

A further object is to provide an automatic rising and falling view finder.

The invention also consists in the details and construction of parts hereinafter described in one convenient form which is shown by way of illustration in the accompanying drawings.

Figure 1:
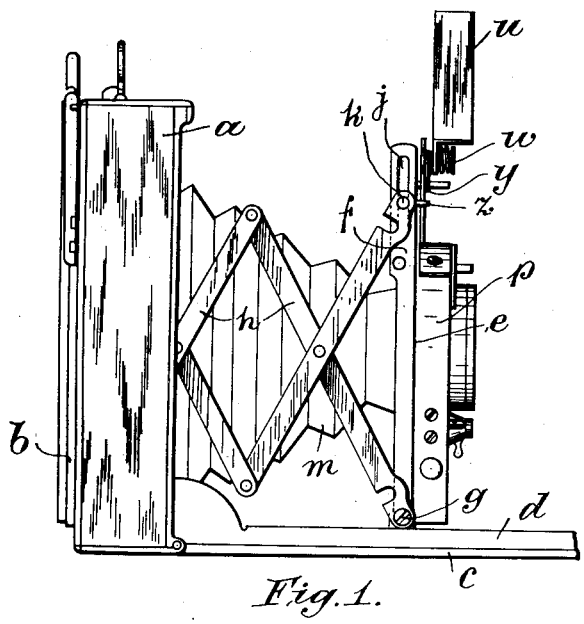
Figure 3:
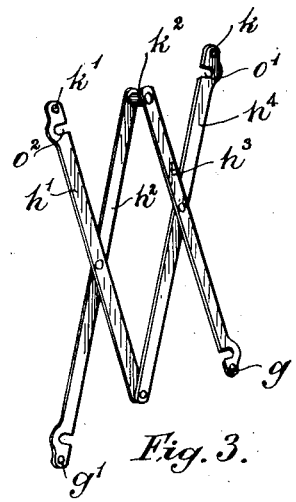
Figures 2, 4:
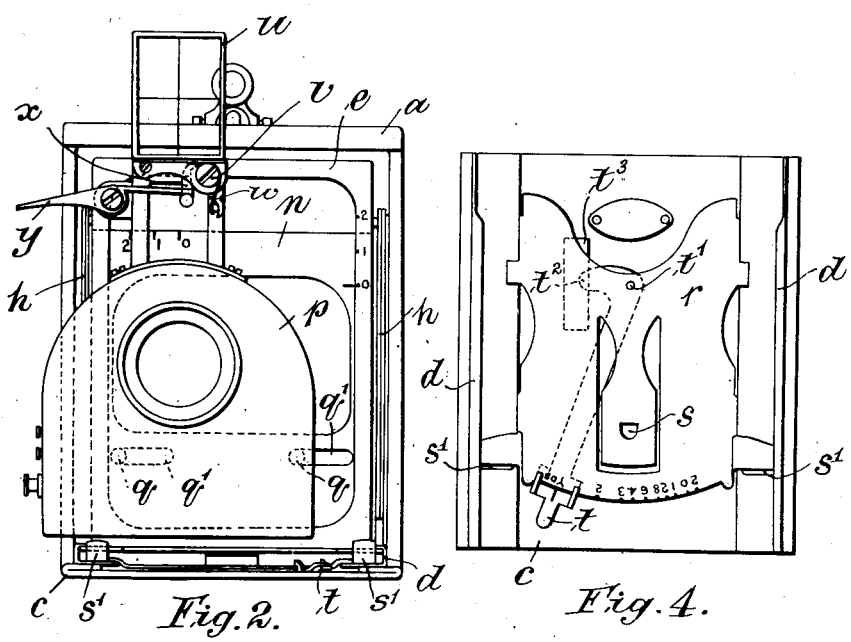

In these drawings:—Figure 1, is a side external view in elevation of the camera. Fig. 2 is a front view of the camera. Fig. 3, is a separate view of the side stiffening lazy tongs. Fig. 4, is a separate view of the parts mounted on the interior of the lid.

A camera according to the present invention embodies a case or box $a$, on the rear side of which the sensitized plate or film is mounted as at $b$. The front of the casing is normally closed by a hinged lid $c$, which when opened as shown in Fig. 1, assumes a plane at right angles to the plane of the case $a$. On the interior of the lid there are provided longitudinal upturned side guides $d$. These side guides $d$, extend in a parallel manner at each side of the lid.

The front of the camera is composed of a front plate $e$, which is adapted to move, as regards its bottom edge, between the guides $d$. The front plate has its forward surface perfectly plain and free from projections. At its vertical sides it is provided with rearwardly projecting lugs or flanges $f$. At the bottom of the front plate there is pivoted at $g$, one lever of a side stiffening lazy tongs $h$. In a slot $j$, in the rearwardly projecting lug or flange $f$, there slides a pin joint $k$, of the lazy tongs. The lazy tongs $h$, comprise a plurality of (preferably two) lazy tongs pairs. One end of the laterally extensible lazy tongs is connected as described to the front plate $e$, while the other ends are connected to the interior of the box or camera case $a$. The purpose of these lazy tongs is to supply lateral rigidity and also to maintain the front plate $e$, always parallel with the sensitized plate $b$. The bellows $m$, extend from the camera front to the rear in the well known manner.

A particular feature of the present invention resides in the arrangement of the lazy tongs and the front plate. As mentioned above the front plate is free of projections on its forward surface, and the sliding pin joint $k$, of the lazy tongs is guided in the slot of the rearwardly projecting lug $f$. With the ordinary form of lazy tongs, when contracted they take up a space equal in width to a multiple of the width of the lazy tongs levers. According to this invention, however, the lazy tongs are so arranged that when contracted they nest into one another and take up a space less in width than a multiple of the width of the pairs and substantially equal to the width of one pair. In this way the lazy tongs practically collapse into the width of the rearwardly projecting lug $f$, so that the rearward edge of the lug $f$, practically passes into the rearward face of the case $a$, and the camera is thus very compact.

To effect the above purpose, the lazy tongs is provided with a spaced joint, that is to say, with a joint at which the converging levers are spaced apart so as to admit adjacent levers to pass and nest between said converging levers.

Referring to Fig. 3, the ends $g$, $g'$, are the fixed pivots to the lazy tongs, the pivot $g$, being in the front plate and the pivot $g'$, in the rear camera case $a$. The pin joints $k$, and $k'$, are sliding, the joint $k$, being guided in the rearwardly projecting lug $f$, and the joint $k'$, being suitably guided in the camera case $a$. The converging levers $h^2$ and $h^3$, are spaced at their joint $k^2$, so that when collapsed the levers $h'$ and $h^4$, can nest between the spaced levers $h^2$ and $h^3$. To enable the levers to collapse into the width of a single lever, the levers $h'$ and $h^4$, are slotted at $o'$ and $o^2$, so that they pass over the bridging pin between the spaced levers $h^2$ and $h^3$.

The lens carrying parts are mounted to slide in two planes on the forward plain surface of the front plate $e$. To this end a plate $n$, is mounted to slide vertically as shown in Fig. 2, on the plate $e$. The lens and shutter casing $p$, is in turn provided with pins $q$, adapted to slide horizontally as shown in Fig. 2, in slots $q'$, in the plate $n$. In this way it will be seen that the lens can be moved in mutually transverse directions in a plane parallel to the plane of the sensitized plate in two directions, so as to obtain what is known as a "double rise." The characteristic feature of the construction described is that this double rise is obtained without sacrificing the rigidity of the camera and without rendering it bulky. Such a camera as that described may therefore be made in exceedingly compact form to meet the requirements of folding pocket cameras. On the interior of the lid, there is also mounted a focusing plate $r$, which is provided with a clip $s$. The focusing plate is also provided with upturned lugs $s'$. When the front plate $e$, is moved outward between the guides $d$, it comes against the front lugs $s'$, and the spring clip $s$, snaps behind it. For the purpose of focusing, the plate $r$, is moved by means of a lever $t$, pivoted at $t'$, to the focusing plate $r$, and having a nose $t^2$, adapted to engage in a recess in a fixed part $t^3$.

The view finder $u$, is pivotally mounted on the front plate at $v$, to oscillate in the plane of the front plate $e$. The view finder is, by means of a spring $w$, normally held in the vertical position shown in Figs. 1 and 2. Connected to the view finder there is a link $x$, which is adapted to be operated by one end of a centrally pivoted lever $y$. The lever $y$, projects into the plane of a projection $z$, carried by the sliding pin joint $k$. In this way when the pin joint $k$, slides upward in the slot $j$, the projection $z$, oscillates the lever $y$, and pulls down the view finder $u$. Thus the view finder $u$, is oscillated through an angle of about 90° before it reaches the front edge of the case $a$. In this position the view finder enters the case $a$, along with the lens case $p$.

We claim:—

1. A camera having an outer case, a lid hinged to said case, guides on the interior of said lid, a front plate movable in said guides, collapsible bellows connecting said front to the rear of said case, lazy tongs levers at the sides and connected to the case and the front, said lazy tongs having a joint at which the converging levers are spaced and a slotted end on an adjacent lever adapted to nest over said joint and between the levers converging at said joint.

2. In a folding camera in combination an outer case, a lid hinged to said case, guides on the interior of said lid, a front movable in said guides and having a plain forward surface thereon, lazy tongs holding said front, substantially upright in said guides, a rearwardly projecting lug on said front and having a slot therein to engage a sliding pin on said lazy tongs levers and lens carrying parts slidable in mutually transverse directions on the aforesaid surface of said front.

3. In a folding camera, a case, a lid hinged thereto, guides on the interior of said lid, a front plate movable along said guides and having a plain forward surface, a rearwardly turned slotted lug on said plate, lazy tongs engaging said case and front plate and having a joint guided in the slot in said rearwardly turned lug, a carrier plate mounted to slide on said front plate and a lens casing slidable transversely on said carrier plate.

4. In a folding camera, a case, a lid hinged thereto, guides on the interior of said lid, a front plate movable along said guides and having a plain forward surface, a rearwardly turned slotted lug on said plate, lazy tongs engaging said case and front plate, said lazy tongs having a joint at which the converging levers are spaced to permit of adjacent levers nesting between said converging levers.

5. In a folding camera, a case, a lid hinged thereto, upturned guides on the interior of said lid, a focusing plate movable on the interior of said plate and having a clip thereon, means for moving said focusing plate, a front plate having a plain forward surface and movable in said upturned guides, said front plate being adapted to engage said clip on the focusing plate, lazy tongs at the sides of said front plate and between the case and front plate, said lazy tongs having a joint at which the converging levers are spaced to admit of adjacent levers nesting therebetween, and lens carrying parts slidable in mutually transverse directions on the plain forward surface of said front plate.

6. A folding camera having a case, a lid hinged thereto, upturned guides on the interior of the lid, a front plate movable in said guides, a slotted lug on said front plate, lazy tongs levers pivoted at one end to said front plate and having a pin joint slidable in said slotted lug, a projecting member carried by said slidable pin joint, a view finder pivotally mounted on said front plate, and an operating lever for said view finder and co-acting with the projecting member on the sliding pin joint to move said view finder automatically into a required position.

7. A folding camera having a case, a lid hinged thereto, upturned guides on the interior of said lid, a front plate movable in said guides and having a plain forward surface, a rearwardly projecting slotted lug on said front plate, lazy tongs levers extensible laterally and having a sliding pin joint slidable in the slot in said rearwardly extending lug, a projection carried by said pin, a view finder pivoted to oscillate on and in the plane of said front plate and an arm for pivoting said view finder and co- operating with the projection carried by the sliding pin joint on the lazy tongs.

In testimony whereof we have signed our names to this specification in the presence of two subscribing witnesses.

EDWIN CECIL WALTERS.
PERCY GEORGE MASON.

Witnesses:
O. J. WORTH,
C. P. LIDDON.